United States Patent
Miller et al.

(10) Patent No.: US 9,894,205 B1
(45) Date of Patent: Feb. 13, 2018

(54) MEASURING CONTACT CENTER AGENT EFFECTIVENESS USING A PREDICTIVE MODEL

(71) Applicant: Noble Systems Corporation, Atlanta, GA (US)

(72) Inventors: Thomas Miller, Westfield, NJ (US); William D. Andrews, Portland, OR (US); Daniel N. Duncan, Austin, TX (US)

(73) Assignee: NOBLE SYSTEMS CORPORATION, Atlanta, GA (US)

( * ) Notice: Subject to any disclaimer, the term of this patent is extended or adjusted under 35 U.S.C. 154(b) by 296 days.

(21) Appl. No.: 14/494,041

(22) Filed: Sep. 23, 2014

(51) Int. Cl.
 *H04M 3/51* (2006.01)
 *G06Q 10/06* (2012.01)
 *G06Q 10/04* (2012.01)

(52) U.S. Cl.
 CPC .......... *H04M 3/5175* (2013.01); *G06Q 10/04* (2013.01); *G06Q 10/06393* (2013.01); *H04M 3/5158* (2013.01)

(58) Field of Classification Search
 CPC .. H04M 3/5175; H04M 3/5158; G06Q 10/04; G06Q 10/06393
 USPC .................................................... 379/265.06
 See application file for complete search history.

(56) References Cited

U.S. PATENT DOCUMENTS

| | | | | |
|---|---|---|---|---|
| 6,954,731 B1* | 10/2005 | Montague | ............... | G06Q 30/02 705/14.43 |
| 8,126,133 B1* | 2/2012 | Everingham | .. | G06Q 10/063112 379/265.01 |
| 2004/0179672 A1* | 9/2004 | Pagel | .................. | H04M 3/5158 379/266.1 |
| 2011/0082723 A1* | 4/2011 | Governatori | ..... | G06Q 10/06398 705/7.42 |
| 2013/0142322 A1* | 6/2013 | Grasso | ............. | G06Q 10/06398 379/265.08 |
| 2014/0249872 A1* | 9/2014 | Stephan | ............... | G06Q 10/063 705/7.11 |

OTHER PUBLICATIONS

The Insidesales.com/M.I.T Lead Response Management Study, Elkington, David, Oldroyd, James, Marketing Sherpas Business-To-Business Demand Generation 4th Annual Demand Generation 4th Annual Summit 2007.

* cited by examiner

*Primary Examiner* — Ahmad F Matar
*Assistant Examiner* — Jirapon Intavong

(57) ABSTRACT

An agent's performance is measured using a predictive model calculating an expected probability of success for each outbound communication, such as a call, handled by the agent that has reached the desired ("right") party. An agent's cumulative actual performance value is maintained based on each "successful" contact, as indicated by a disposition code provided by the agent. A cumulative expected probability value of a "successful" communication is also maintained based on each call that reaches the right party where the expected probability of a "successful" call is determined by the predictive model. The agent's performance value can be determined by comparing the cumulative actual performance value with the cumulative expected probability of success value. The agent's performance value can then be compared to the performance value of other agents to identify agents performing above-expectations or below-expectations.

16 Claims, 7 Drawing Sheets

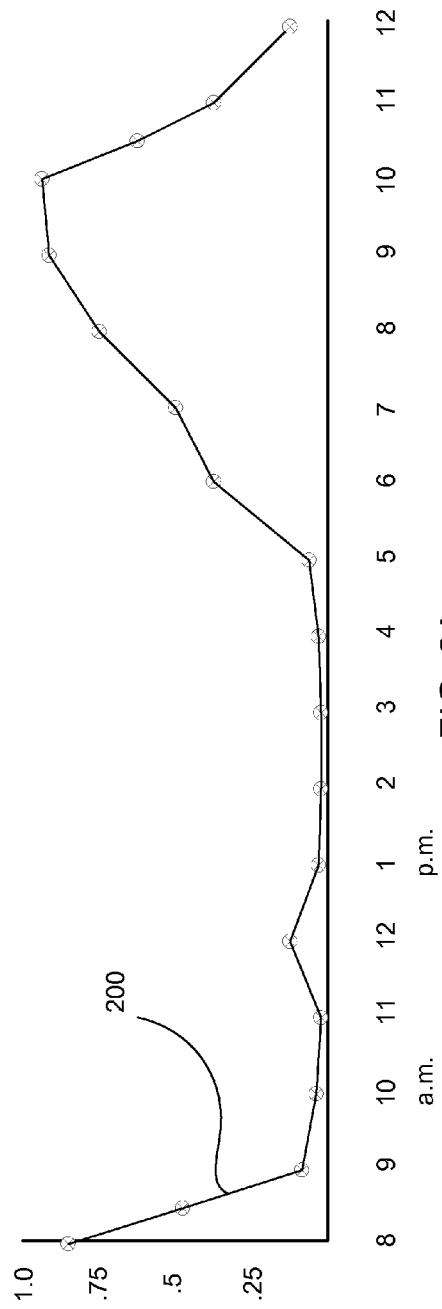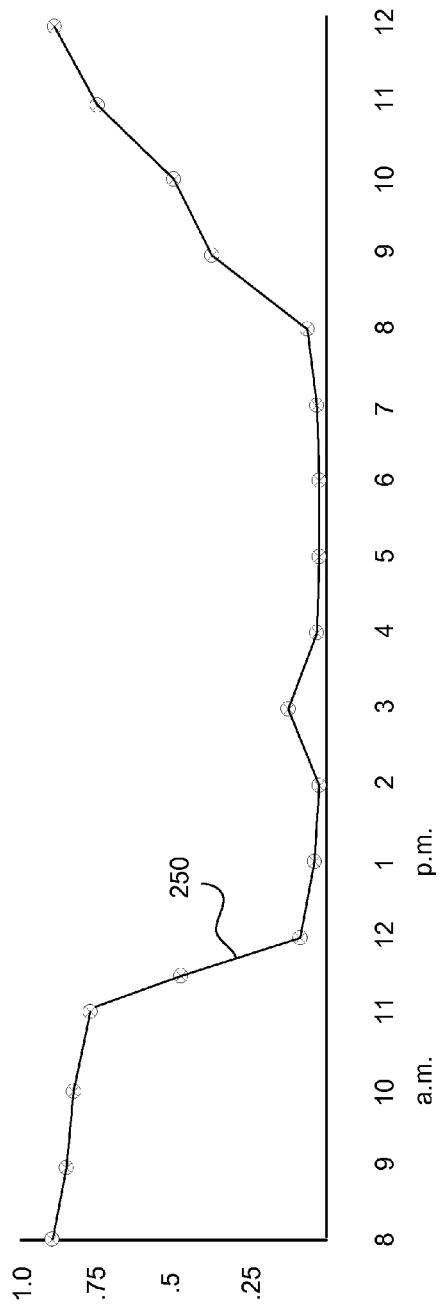

MEASURING CONTACT CENTER AGENT EFFECTIVENESS USING A PREDICTIVE MODEL

BACKGROUND

Measuring employee effectiveness is an important part of any managerial function in a business. The criteria on which employees are measured typically depend on the specific work environment. In the contact center or call center context, the criteria may comprise a number of key performance indicators ("KPIs") that are frequently used to measure an agent's work performance.

In some instances, performance metrics may be readily selected and accurately measure the agent's performance. For example, agents engaged in telemarketing sales or soliciting donations may have their performance measured by the dollar amount of sales or donations that they obtain. Tracking an aggregate dollar amount is relatively easy and may provide a suitable absolute indicator of an agent's performance.

In many cases, the parameters used to measure an agent's performance are not necessarily based on their effectiveness in measuring agent performance, but based on the ease in which the parameters can be obtained and processed. For example, using a dollar amount would not effectively measure agents that provide customer service, since no purchases or donations are received. In this case, using the duration that an agent is involved on a call can be easily and precisely measured. The call duration includes the time the agent was initially connected until the time the agent was disconnected. However, the call duration does not necessarily inform management how effective an agent performs a particular task. For example, it would appear desirable for such an agent to have very short calls, as this would allow the agent to handle more calls. In this case, the agent keeping calls as short as possible with callers may not satisfactory resolve the callers' issues and these callers may be forced to call back. This can result in increased customer dissatisfaction and actually cause more time to be involved cumulatively by the agents. This illustrates how an agent may strive to increase their performance based on maximizing a measured performance parameter that may not accurately measure the agent's performance.

It may be difficult for management to measure whether customer issues are actually resolved during a call, but it may be easy to measure the duration of the call. Therefore, there may be a temptation by management to measure agents based on their call duration, even though that performance metric is not directly related to measuring whether customer issues are resolved in an efficient manner.

Once an appropriate metric is determined for measuring agent performance, an agent having poor performance may complain that this is due to the particular list of numbers associated with a particular group of customers or prospects that are assigned to the agent. It is possible that agents working on different campaigns, or different calling lists from the same campaign, may reflect different demographics that intrinsically impact each agent's performance. For example, agents soliciting political donations for a particular political party may encounter different results when assigned to call individuals from certain states. Residents from a certain state or city may be more likely affiliated with a particular political party and thus more or less willing to provide a donation. An agent may rightfully argue that this impacted their performance and had they been assigned a different state, their performance would have been better. Further, the agent may argue it is inappropriate to compare their performance with another agent who was assigned calls made to a different state or city, between agents handling calls made on the weekday versus weekend, or some other times (e.g., prime time versus non-prime time, however that is defined). Further, if the agents are split among handling different campaigns, it may be difficult to compare e.g., a first agent's performance in a calling campaign directed to soliciting political donations with a second agent's performance in a calling campaign soliciting religious donations. In another example, it may be difficult to compare agents attempting to collect on an automobile loan with agents attempting to collect on a credit card debt.

Addressing agent performance evaluation requires systems and methods that can properly detect when an agent is performing above (or below) expectations independent of the campaign type and the telephone numbers of the prospects/customers assigned to that agent, thus ensuring that the performance measurement is not due to intrinsic variations of the calling list or some other external factor. In other words, comparing agent performance requires a common baseline among the agents being evaluated that eliminates such factors. That is to say, while agents cannot control if they reach a called party, they may be able to impact the outcome of the call. Once such externals factors are equalized between agents, then differences in the outcomes of the calls may be attributed to the agent's skill. It is with respect to these and other considerations that the disclosure herein is presented.

BRIEF SUMMARY

In general, embodiments of the present invention provide computer program products, methods, systems, apparatus, and computing entities for determining an agent's performance in a contact center based on using a predictive model that predicts the likelihood of success for each call once contact with the desired party is achieved. In one embodiment, the predictive model is used to ascertain an expected likelihood of success for each individual party reached by the agent, which is used to develop a cumulative expected likelihood of success for the agent. An actual level of success is maintained for each account reached by the agent, and the agent's performance can be determined by comparing the cumulative expected likelihood of success for the accounts handled by the agent with a cumulative actual level of success for the accounts handled by the agent. An agent having a cumulative actual level of success greater than the cumulative expected level of success is an agent that is performing above expectations. Conversely, an agent having a cumulative actual level of success lower than the cumulative expected level of success is an agent performing below expectations.

As is discussed in greater detail below, the subject matter disclosed herein may be implemented as a computer-controlled apparatus, a method, a computing system, or as an article of manufacture such as a non-transitory computer-readable storage medium. These and various other features will be apparent from the following Detailed Description and the associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE SEVERAL VIEWS OF THE DRAWINGS

Reference will now be made to the accompanying drawings, which are not necessarily drawn to scale, and wherein:

FIGS. 2A-2B illustrate a best-time-to-call distribution of the likelihood of reaching a first party and a second party, respectively, at various times during a day.

DETAILED DESCRIPTION

Figure 1:
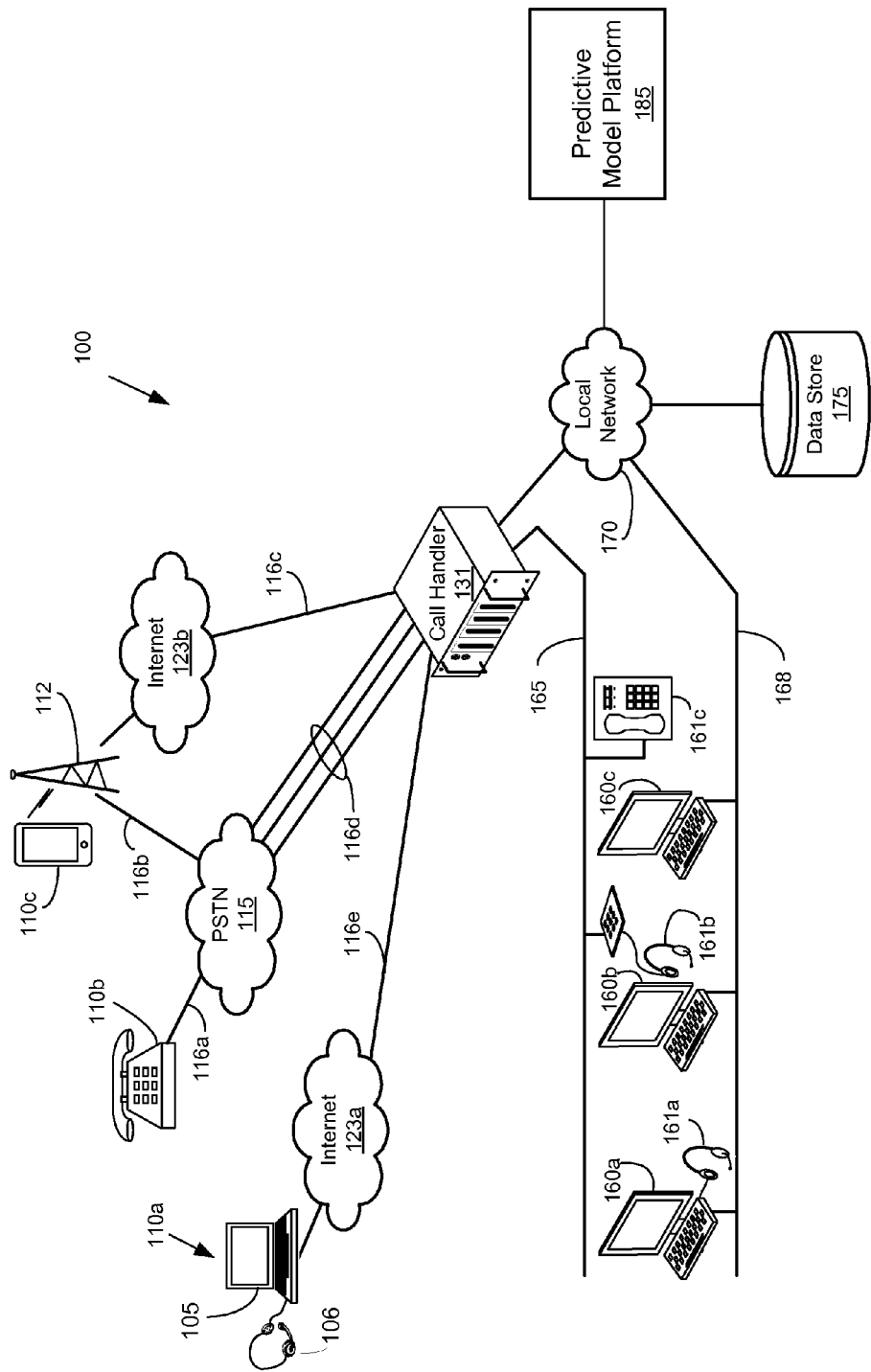
FIG. 1 shows one embodiment of a contact center architecture that may be used to practice the various concepts and technologies disclosed herein.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Embodiments of the invention may be utilized in various industries, as will become apparent to those of ordinary skill in the art as they read the disclosure. The principles of the invention are illustrated using contact center agents as employees, but the concepts and technologies disclosed herein could be applied to other types of employees and industries.

Exemplary Contact Center Architecture

FIG. 1 shows one embodiment of a contact center architecture 100 illustrating the various technologies disclosed herein. The contact center shown in FIG. 1 may process voice calls that are inbound-only, outbound-only, or a combination of both (sometimes referred to as a "blended" contact center). Thus, in some instances, the contact center may be referred to as a call center when referring primarily to the context of handling calls. Although many aspects of contact center operation are disclosed in the context of voice calls, in various embodiments, the contact center may process other forms of communication such as, for example, facsimiles, emails, text messages, video calls, and chat messages.

Since the contact center may handle calls originating from a calling party, or initiated to a called party, the term "party" or "remote party" without any further qualification, refers to a person associated with a call processed by the contact center, where the call is either received from, or placed to, the party. The term "caller," if used, will generally refer to a party communicating with the contact center, but in many cases this usage is exemplary. Thus, use of the term "caller" is not intended to limit the concepts to only inbound calls to the contact center or voice calls, unless the context dictates such.

Depending on the embodiment, inbound voice calls may originate from calling parties using a variety of different phone types. For instance, a calling party may originate a call from a conventional analog telephone 110b connected to a public switched telephone network ("PSTN") 115 using an analog plain old telephone service ("POTS") line 116a. The call may be routed by the PSTN 115 and may comprise various types of facilities 116d, including, but not limited to: T1 trunks, SONET based fiber optic networks, ATM networks, etc. Various types of routers, switches, bridges, gateways, and other types of equipment may be involved in the processing of the calls.

Inbound voice calls may also originate from a smart phone device 110c, such as a smart phone, tablet, or other smart device, which wirelessly communicates with a mobile service provider ("MSP") 112. The voice calls may be routed to the PSTN 115 using an integrated services digital network ("ISDN") interface 116b or other types of interfaces that are well known to those skilled in the art. In particular embodiments, the MSP 112 may also route calls as packetized voice, referred to herein as voice-over-IP ("VoIP") to an Internet provider 123b using Internet-based protocols. For convenience, unless indicated otherwise, the term "trunk" refers to any type of facility 116c, 116d, or 116e providing voice calls to, or from, the contact center, regardless of the type of protocol or technology used. Specifically, a "trunk" is not limited to time-division multiplexing ("TDM") technology. Inbound voice calls may also originate from a calling party employing a so-called "IP phone," "VoIP phone," or "soft phone" 110a. In one embodiment, this device may comprise a computing device 105, such as a laptop, computing tablet, or other electronic device, which processes voice data and interfaces with a headphone/microphone combination, also referred to as a headset 106. The computing device 105 may in turn be connected to an Internet 123a. Those skilled in the art will recognize that a variety of protocols and facilities may be used to convey voice calls.

In various embodiments, inbound calls from callers to the contact center may be received at a call handler 131, also referred to as a call handling system ("CHS") which can be, e.g., an automatic call distributor ("ACD"). In particular embodiments, the call handler 131 may be a specialized switch for receiving and routing inbound calls under various conditions. The call handler 131 may route an incoming call over contact center facilities 165 to an available agent. Depending on the embodiment, the facilities 165 may be any suitable technology for conveying the call, including but not limited to a local area network ("LAN"), wide area network ("WAN"), ISDN, or conventional TDM circuits. In addition, the facilities 165 may be the same or different from the facilities used to transport the call to the call handler 131.

In various embodiments, calls may be routed over facilities 165 by the call handler 131 to an agent for servicing. That is, for example, the party may speak with an agent to receive customer service. In other embodiments, the call may be routed using a local network 170 over facilities 168, to the agent's phone. An agent typically uses a computing device 160a-160c, such as a personal computer, and a voice device 161a-161c. The combination of computing device 160a-160c and voice device 161a-161c may be referred to as a "workstation." In many instances, the computing device handles VoIP so that reference to the "computer workstation" or the "agent's computer" refers to the computer processing device of the workstation, but which may be closely integrated with handling voice as well. Thus, for these particular embodiments, the workstation can be assumed to have at least a data capability and may have a voice capability.

Depending on the embodiment, interactions between the call handler 131 and agent computers 160a-160c, as well as other components, may involve using the local area network ("LAN") 170. In particular embodiments, when an agent is interacting with a called or calling party, the agent may use his computer 160a-160c to further interact with other enterprise computing systems.

In addition to receiving inbound communications, including, for example, voice calls, emails, text messages, and facsimiles, the contact center may also originate communications to a called party, referred to herein as "outbound" communications.

Thus, in some embodiments, the call handler 131 may comprise a dialer, such as an automated dialer, predictive dialer, preview dialer, manual dialer, or any other dialer known to those skilled in the art of contact centers. The dialer is used to originate outbound calls at a rate designed to meet various criteria. In various embodiments, the call handler 131 is typically configured to dial a list of telephone numbers to initiate outbound calls. Data for the calls, including disposition codes that indicate various information associated with the call (e.g., the outcome of the call, agent identifier, time, etc.) may be stored in a data store 175. After the calls are originated, a transfer operation may connect the call with an agent or a queue.

As noted, after an agent completes handling a call, the agent may enter a call disposition code that reflects the outcome of the call. This process, called "call dispositioning," provides an indication to the call handler and/or other systems as to whether the agent succeeded in obtaining a sale, completing a transaction, obtaining a promise to pay from a person, resolved an issue, etc. The call handler may maintain individual and cumulative records for each agent, which can be useful for evaluating the agent's performance.

Finally, the contact center architecture 100 may include a predictive model platform component 185. The predictive model platform may be used to develop, test, and modify the predictive model. Once developed, the predictive model platform may execute the model for each account the agent interacts with so as to compute an expected probability of success, however success is defined. The predictive model platform may be a processing system as described later herein, and may store data of the expected probabilities in the data store 175, as well as store data of the actual success outcomes of each account that the agent interacted with. In other embodiments, the data store 175 may be integrated with the call handler 131, the predictive model platform component 185, or another component.

Although a number of the above entities may be referred to as a "component," each may be also referred to in the art as a "computing device," "unit", "server," or "system." A component may incorporate a local data store and/or interface with an external data store. Use of the word "server" does not necessarily require the component to interact in a formal web-based client-server arrangement with other components, although that may be the case. Further, the above components may be located remotely from (or co-located with) other components. Furthermore, one or more of the components may be implemented on a single processing device to perform the functions described herein. In addition, the contact center architecture 100 may be provided as a hosted solution, where the call processing functionality is provided as a communication or software service (a so-called "communication-as-a-service" ("CaaS") or "software-as-a-service" ("SaaS")) to a contact center operator. Thus, there is no requirement that the components identified above must be actually located in a contact center location or controlled by a contact center operator. In addition, depending on the embodiment, the agent positions may be remotely located from the other components of the contact center, sometimes referred to as a "virtual contact center." Those skilled in art will recognize FIG. 1 represents one possible configuration of a contact center architecture 100, and variations are possible with respect to the protocols, facilities, components, technologies, and equipment used.

Service Overview

A contact center may originate calls for various purposes, and for purposes of illustration, the concepts and technologies herein are presented in the context of outgoing calls from the contact center that are originated for the purpose of collecting debts (i.e., so-called "debt collection calls"). The contact center may attempt to collect debts of various types, including debts related to credit card accounts, automobile loans, home mortgages, loans for mobile homes, motorcycles, boats, student debt, etc. The contact center could be operated by a third party, such as a debt collection agency, or by the loan originator (e.g., in-house collections department). The specific circumstances regarding the purposes of originating the call can be referred to as a "call type." For example, a debt collection call type involves collecting a debt, and further granularity can be indicated by defining a particular type of debt collection call, such as a credit card debt collection call type.

It is possible that the contact center may use different calling lists associated with the different call types, e.g., one list for delinquent credit card accounts and another for loans pertaining to vehicles. It is also possible that a single list could be used for the various accounts. A dialer may be used to generate calls to the accounts and detect when the call is answered by a person. If so, then an agent is connected to the line. The dialer may be able to detect calls that are not answered, receive an intercept announcement, or are answered by an answering machine or forwarded to voice mail. These calls are typically not connected to an agent.

If the call is answered by a person, then an initial action by the agent typically involves asking for the appropriate person, typically by name. This ensures that the agent is not speaking to, e.g., a roommate, spouse, guest, child, etc. If the agent is speaking to the desired ("target") party, then this is referred to as obtaining a "right party connect" ("RPC") because the right party has been reached. The determining of a "right party" is dependent on the call type. For example, for a debt collection call type, the right party is typically the holder of the debt (e.g., debtor). It may be unproductive for purposes of the present call type (i.e., debt collection call types) if another individual in the household is reached by the agent. However, in the case of a survey or donation solicitation, any adult in the household that is reached may be considered a "right party" for purposes of the call type.

Some contact centers may attempt to increase the likelihood of obtaining a RPC by taking into account when the right party will be available to answer the phone. This is sometimes referred to as ascertaining the "best time to call" (BTTC). A BTTC distribution may be developed and used. The BTTC determination can be developed by model, application of rules, or other known techniques. Application of the BTTC may be particularly relevant if a wired or landline telephone is being dialed, such as a home telephone number and the call type involves a particular individual as the right party, e.g., such as for debt collection call types. In such cases, if the debtor is not home, then a RPC cannot occur. The BTTC distribution attempts to determine when the right party will be home and thus is available and willing to answer the call. Calling too late may be prohibited by various regulations related to the call type, and further, the target party may be unlikely to answer the call. In one approach, this can be illustrated by mapping the probability of a RPC with respect to the time-of-day. There are a number of well-known programs for analyzing a call history of previously completed calls to ascertain the BTTC to reach a party at a particular number. In one embodiment, the probability of reaching a particular party can be calculated for a series of contiguous time periods, such as for a 12 hour time period during a day (e.g., 8:00 a.m. to 8:00 p.m.).

FIGS. 2A and 2B illustrate a hypothetical BTTC distribution for two separate target parties. For purposes of simplification, each graph illustrates a typical workday for each respective party. In FIG. 2A, the target party works a 9 a.m.-5 p.m. job, and usually leaves their house shortly after 8:30 a.m. The target party usually is at their work location during lunch, but may occasionally be at home for lunch. The target party leaves work at 5:00 p.m., and typically arrives home shortly thereafter. They typically answer their phone if it rings before 10 p.m., but in this assumption, the likelihood decreases as the evening progresses. The hypothetical BTTC distribution 200 reflects this typical work schedule for a party, and it is evident that calling during their expected working hours results in a lower likelihood of having them answer the phone, than if they are called early morning or in the evening. A different schedule and distribution may exist for the weekends. Although the distribution for FIG. 2A extends to midnight, in practice many BTTC distributions that are generated terminate earlier, e.g. at 9:00 p.m.

FIG. 2B shows another hypothetical BTTC distribution 250 for another target party, which works an afternoon shift, typically from noon to 8:00 p.m. Similarly, the person is more likely to be available to answer the phone late morning or late at night.

It is evident that the probability of an agent obtaining a RPC may be influenced by when the agent works relative to when the best times are to reach the target party. For example, if the agent works a day shift, from 9:00 a.m. to 5:00 p.m. and attempts to reach the target party during this time period, then the likelihood of reaching the first party associated with FIG. 2A is low, as that target party is likely to not be home during those times during their work week. However, the likelihood is different with respect to reaching the second party associated with FIG. 2B. In this case, the agent may have a higher likelihood of reaching the right party in the late morning, before 11:00 a.m.

When a live person has answered the phone and has been confirmed as the right party, the agent can continue with the call and perform their duties. In the example used to illustrate the concepts and principles of the invention, the agent is involved in collecting the debt, although other illustrations could be used. "Collecting the debt" may involve talking with the individual about their debt and repayment thereof. A "successful" call from the agent's perspective may be obtaining a promise to pay ("PtP") from the individual. This may include defining a particular date and amount by which payment will be made. For purposes of illustration, it can be assumed that once an agent is speaking with the appropriate individual, a "successful" call for a debt collection call type is a call that involves obtaining a PtP from the called party. Thus, an agent's performance can be rated based on the relative number of PtPs obtained.

Agents may indicate the outcome of a call by entering a disposition code. The types of disposition codes that can be used are defined by the contact center operator. The disposition code reflects the outcome of the call, and in the above example, a disposition code could be defined reflecting the individual's PtP commitment. Different codes may be defined to indicate whether the individual made a PtP, is unable to commit to making a payment at the present time, has alleged the debt is paid off, will pay in full, will pay by an indicated due date, etc.

There may be mechanisms in place to discourage an agent from incorrectly entering a successful disposition code. For example, call recordings may be maintained, and these may be periodically reviewed either manually or by a speech analytics system, so that an agent attempting to enter incorrect disposition codes may be detected. This discourages an agent from falsely dispositioning each call as resulting in a PtP in an attempt to inflate their performance values. Thus, it is presumed that agents will, by and large, enter accurate disposition codes. These codes can then be compiled to reflect each agent's relative performance. As noted earlier, other calling campaigns may have different criteria for measuring an agent's effectiveness, such as obtaining an actual donation, which is easily verifiable.

It can be appreciated that an agent's ability to obtain a PtP depends in part on obtaining a RPC. Thus, a first agent working a particular shift may encounter very few RPCs and a second agent may encounter very many RPCs. The first agent may have a much more difficult time obtaining a PtPs if the right parties are rarely encountered. Thus, in many embodiments, the agent's performance is only evaluated when a RPC is obtained.

Once a RPC is obtained, the skill of the agent in interacting with the individual plays a part in being able to obtain a PtP. Other factors may be involved. For example, the ability to collect on the debt may also depend on the nature of the debt. Some of these factors may include:
  whether the individual is delinquent for the first time on the debt,
  whether the debt is considered to be in an 'early' state of delinquency,
  whether the debt is considered to be in a 'late' stage of delinquency,
  the type of debt (credit card, automobile, recreational vehicle, etc.),
  amount of the debt, and
  day of the month (e.g., relative to when the debtor may receive a pay check).

For example, an individual that becomes delinquent on a debt (e.g., an installment loan) for the very first time may have inadvertently missed a payment. Such an individual, when contacted, may readily agree to submit a payment. Thus, agents handling these types of calls may have a higher likelihood of obtaining a PtP as opposed to an individual with a history of missing payments. Similarly, calling a debtor during an early stage of delinquency may lead to the agent having a higher probability of obtaining a PtP as opposed to at a late stage of the debt. The parameters of what constitutes an early versus a late stage of delinquency may vary in various embodiments. However, the exact time limits may not be relevant as long as all numbers in the list conform to the same category definitions. As can be appreciated, these various factors may impact the ability to obtain the PtP by the agent, in addition to the skill of the agent.

The type of debt may also impact the debtor's willingness to offer a PtP, sometimes referred to as a "payment hierarchy." A car loan debt may be very important to the debtor, as the car could be repossessed if the debtor falls behind in making payments. The debtor may be aware that repossessing the car would adversely impact the debtor's ability to commute to work and create further financial issues. On the other hand, a debt for a recreational vehicle may have a different relative importance to the debtor. Further, the debtor's willingness to promise payment may be correlated with the debtor's paydays, so that calling a debtor at the beginning of a month (after they have typically received a paycheck) may impact their ability to provide a PtP.

The calling lists may (or may not) be divided into groups based on these factors. As can be appreciated, there are numerous factors that may impact the debtor's willingness to provide a debt-collection agent with a PtP at a given time. Thus, given two different agents processing two different calling lists (which may represent different categories of debtors), the agents' performances may vary greatly. One agent may be able to extract more PtPs than the other agent, but this may be due to the intrinsic nature of the lists, as opposed to the agent's intrinsic ability. In other words, an agent may excuse their poor performance because the agent had a "bad" list and/or the other agent had a "better" list.

Even agents working from the same call list (e.g., for the same call type) may have different results based on extrinsic factors. For example, an agent working the day shift may be given a list of numbers that largely has the BTTC characteristic shown in FIG. 2A. Ostensibly, that agent will likely have a lower right party connect rate than if the list were reflective of the BTTC shown in FIG. 2B. Similarly, an agent working an evening shift may encounter a higher right party connect in reaching target parties in the evening if the list has numbers largely reflecting the BTTC of FIG. 2A. As evident from the above, one way to negate such differences is to only analyze the results of an agent's RPCs or a percent thereof, as opposed to all of the call attempts. Another approach is to ensure that a minimum number of RPCs have been achieved by the agent before evaluating the agent. It appears reasonable to expect that an agent will have a harder time to reach the same number of PtPs if only a few RPCs are obtained during their shift.

Similarly, with respect to the various types of debts and related factors, ascertaining an agent's performance relative to other agents needs to take into account these other factors. "Good" agents that have a higher ability to obtain a PtP may be rewarded by receiving higher compensation. Thus, agents and contact center operators have an interest in identifying "good" agents that have a higher level of intrinsic performance. In addition, management has an interest in identifying above-average performance agents, to ensure they are retained. Making such determinations by an objective process avoids relying on judgmental factors, which tend to have significant variation based on the supervisor and/or agent involved. Similarly, management has an interest in identifying below-average performing agents, so that their performance can be improved, typically by providing these agents additional training. Frequently, the good agents may mentor the poor agents, and so it is critical to properly categorize the agents.

Merely identifying which percentage of calls that resulted in a PtP may not be an accurate basis to compare agent performances, since it does not take into account the other factors that may impact the outcome. One approach for measuring an agent's performance involves isolating these other potential factors via application of a predictive model. A predictive model can be defined that provides an expected probability of a PtP, represented as $P_e(PtP)$. The predictive model, in effect, provides the $P_e(PtP)$ for each RPC by taking into account all the various factors that could impact receiving a PtP, and 'normalizes' these out. In other words, the predictive model provides an expected probability of the PtP that takes into account all the cumulative experience of all agents, all accounts, and other various factors. This results in developing a probability of success that is independent of a particular account, call type, time of day, etc. Then, an agent's cumulative actual performance can be compared to the $P_e(PtP)$ to determine whether the agent has exceeded an expected performance or has not met the expected performance. This comparison will indicate whether the agent has performed better or worse than expected, regardless of the various factors that may impact an agent obtaining a PtP. The assumption is that any factor that could impact an agent's ability to obtain a PtP is reflected in the model, which is based on historical calls. In essence, this approach for evaluating agent performance removes the excuse that the agent received a "worse" or "better" list compared to other agents, or which may be due to other factors.

Typically, the predictive model is developed using a historical dataset of calls and related information, including their outcomes. Such related information may include customer profile information, such as days per dollars past due, total amount owed, historical payments, employment status, etc. In one embodiment, the calls for a recent history are used, such as for the previous month or two, assuming that a sufficiently large sample was obtained. Typically, a minimum number of calls of a certain outcome are required to provide an accurate model, and that number depends on the circumstances. From the dataset of historical calls, models are built which provide a predicted $P_e(PtP)$ outcome. Ideally, a model developed using the historical dataset would predict with 100% accuracy the outcome if those same calls were then processed by the model. Typically, the model initially developed is not 100% accurate, though. Approaches for building a predictive model are disclosed in U.S. Pat. No. 5,802,161, entitled "Method and System for Optimized Scheduling" and U.S. Pat. No. 5,621,790, entitled "Method And System for Optimization of Telephone Contact Campaigns."

Once the predictive model is developed, it can be applied to a set of new calls in which the right party is reached (e.g., RPCs) that are handled by agents during an evaluation time period. Presumably, the new calls are similar in nature (within an acceptable statistical deviation) as to the calls in the historical dataset. The expected number of PtPs can be calculated and compared to the number of PtPs actually obtained by a particular agent. The expected number of PtPs can be ascertained by multiplying the average $P_e(PtP)$ by the number of RPCs. The difference can be attributed to the inherent ability of that agent. For example, the $P_e(PtP)$ for each call that reached a RPC can be accumulated during a given time period and compared to the actual success of the agent in reaching those calls. This may require a certain minimum number of calls before the results accurately reflect the agent's performance level.

If the number of calls the agent is measured upon is too low, the results may not be representative of the agent's ability, but more of the agent's success for a short snapshot in time. Techniques for utilizing a chi-square test can be incorporated to analyze the statistical significance of the results. For example, if the expected probability of a successful outcome after reaching two particular accounts is both 0.1 (e.g., 10%), then it would be premature to attempt to evaluate an agent after only two calls. In this case, the expected probability of success would be 20% and an agent achieving a successful outcome could be allocated a single point (e.g., "1") for each successful call. Thus, the agent would have a cumulative actual result of 0, 1, or 2 points. If zero, the agent would be performing below expectations, but this may not be reflective of their long-term performance. A result of 1 or 2 would mean the agent is performing at 500% or 1000% of predicted performance, respectively. Neither is likely to be an accurate measurement of the agent's expected performance relative to a long-term measurement involving, e.g., 100 calls.

The model can be continually or periodically refined by applying recent call results or larger samples to optimize the model. The expected outcome using the recent call results can be compared to the actual call results and used to improve the accuracy of the model by e.g., accounting for trends. Applying a larger sample can improve the accuracy of the model by ensuring it is based on a more representative sample. Thus, periodically (e.g., every month), the results of the calls can be compared to the predictive results of the model to see if the model can be improved, such as adapting to seasonal changes, new data sources, trends, etc. Updating the model can account for global factors impacting the likelihood of obtaining a PtP or adding a new call type to the mix. By refining the model, any deviations that could be attributable for a particular reason are taken into account.

For example, over a year's time, it may be noticed that all agents are experiencing an increase in the number of PtPs each month relative to the predicted number. This change may be explained because of a gradual improvement of economic conditions, which has resulted in an overall increase in the number of PtPs month-over-month for all agents. Regardless of the reason for the increase, refining the model by incorporating these call results can take into account this global trend, whereas the original model was developed under different economic conditions, and therefore reflected those conditions. Consequently, this process can remove the impact of global economics, and allow a normalized comparison of the agents' relative performances. In other words, the improvement of general economic conditions would be expected to lead to an increase of PtPs for all agents, and the increase in PtPs obtained by agents does not necessarily reflect that the agents are all becoming "better" agents. By updating the model, this factor is implicitly taken into consideration. In fact, even factors that are not explicitly identified as impacting the agents' results are taken into consideration. Thus, it is not important whether the overall increase in obtaining PtPs is due to a gradual improvement of economic conditions or some other factor, as the model incorporates the results regardless of why the results occurred.

The predictive model(s) may be defined in any number of ways. Thus, a first predictive model could be defined for the expected PtP for an automobile loan debt collection call type. A second predictive model could be defined for a credit card debt collection call type. Agents assigned a mix of automobile and credit card debt collection calls could be compared by examining their respective PtP totals for automobile and credit card debt collection call types using the two respective models. Thus, even if different agents have different relative mixes of call types (e.g., 80% automobile debt calls versus 20% credit card debt calls), the final performance results can be compared without further adjustment. Without the use of a predictive model indicating the expected results, one agent could rightfully argue that their actual PtP totals were impacted by the particular mix of calls they handled (e.g., they had a higher mix (50%) of credit card debt calls as opposed to automobile debt calls).

Alternatively, if the model is built for a portfolio that is a mix of automobile and credit card debt collection calls, then this model could be applied to agents making calls from the list assuming agents are randomly assigned calls from the list. Again, this would prevent an agent claiming that the numbers they dialed were "better" or "worse" compared to other agents.

For example, an agent involved in completing 1000 debt collection calls of a certain type may have received 556 PtPs. This actual number can be compared to an expected value of PtPs based on the predictive model previously developed. If the model indicates the $P_e(PtP)$ for each call is 0.40, then for a 1000 calls, the agent would be expected to have obtained 400 PtPs. Since the agent obtained 556, the agent is operating at 556/400*100%=139% of expectations. An agent handling a different portfolio of debt collection calls may have a different applicable predictive model. Assume that the $P_e(PtP)$ for this different predictive model and call type is 0.050. In this case, the agent may handle 600 calls and it would be expected that 600*(0.050)=30 calls would result in obtaining a PtP. If the agent obtains 25 PtP, then the agent is working below expectations, namely at 25/30*100%=83% of expectations. Thus, the model allows agents from different campaigns to be compared on a normalized basis.

Distinction from Existing Relative Agent Average Reports

It can be appreciated that the above approach provides a more accurate indication of relative agent performance as compared to conventional comparisons of agent performance to average agent performance. Contact centers typically provide reports of certain agent averages, frequently called key performance indicators ("KPIs"). A typically parameter may be an agent's talk time, number of calls handled, closed sales, etc. A report can be generated indicating an agent's average KPI for the day relative to the total average of agents. A deficiency of such reports is that while the indicator may be easily measurable (e.g., number of calls handled), the indicator may not be very useful. For example, merely knowing that an agent handled twice as many debt collection calls as the average agent is not very useful. The agent may not have been very productive. On the other hand, some parameters, such as dollars of revenue of product sold, may be more useful, but it does not provide a relative comparison. An agent selling industrial machinery versus an agent selling office supplies may have vastly different sales volumes. Returning to the above example, knowing one agent obtained 256 PtP versus 25 PtP is not a useful comparison by itself. Further, just because the agent selling industrial machinery has a larger sales volume does not necessarily indicate that agent is performing better. Only when the sales are compared to their expected sales volume can the relative assessment be made. Once the expected probability of a sale is taken into account, then each agent's relative performance can be normalized and compared to each other.

Process Flows

Figure 3:
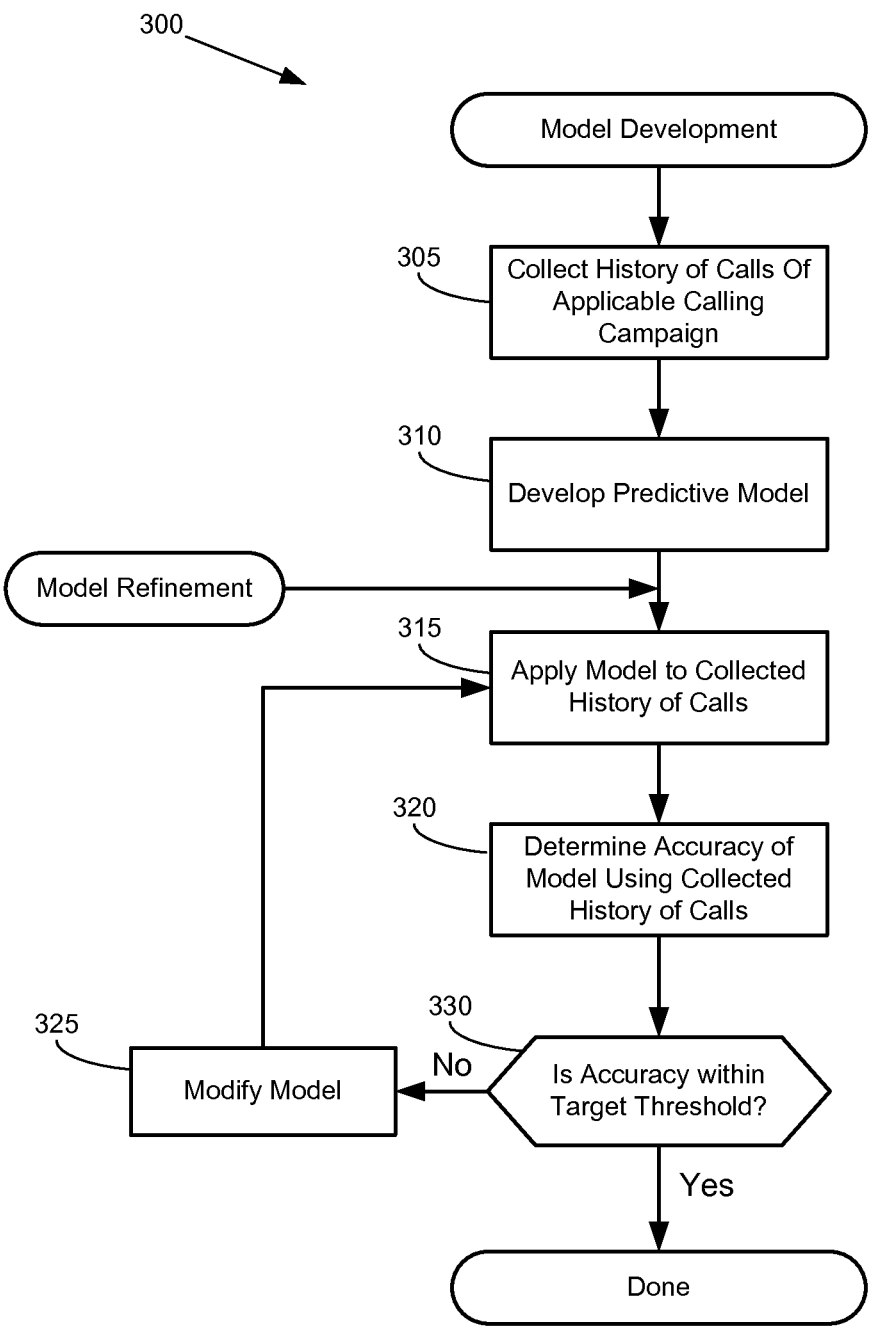
FIG. 3 illustrates a process flow of an embodiment for developing a model for predicting the expected probability of a successful outcome.
Figure 4:
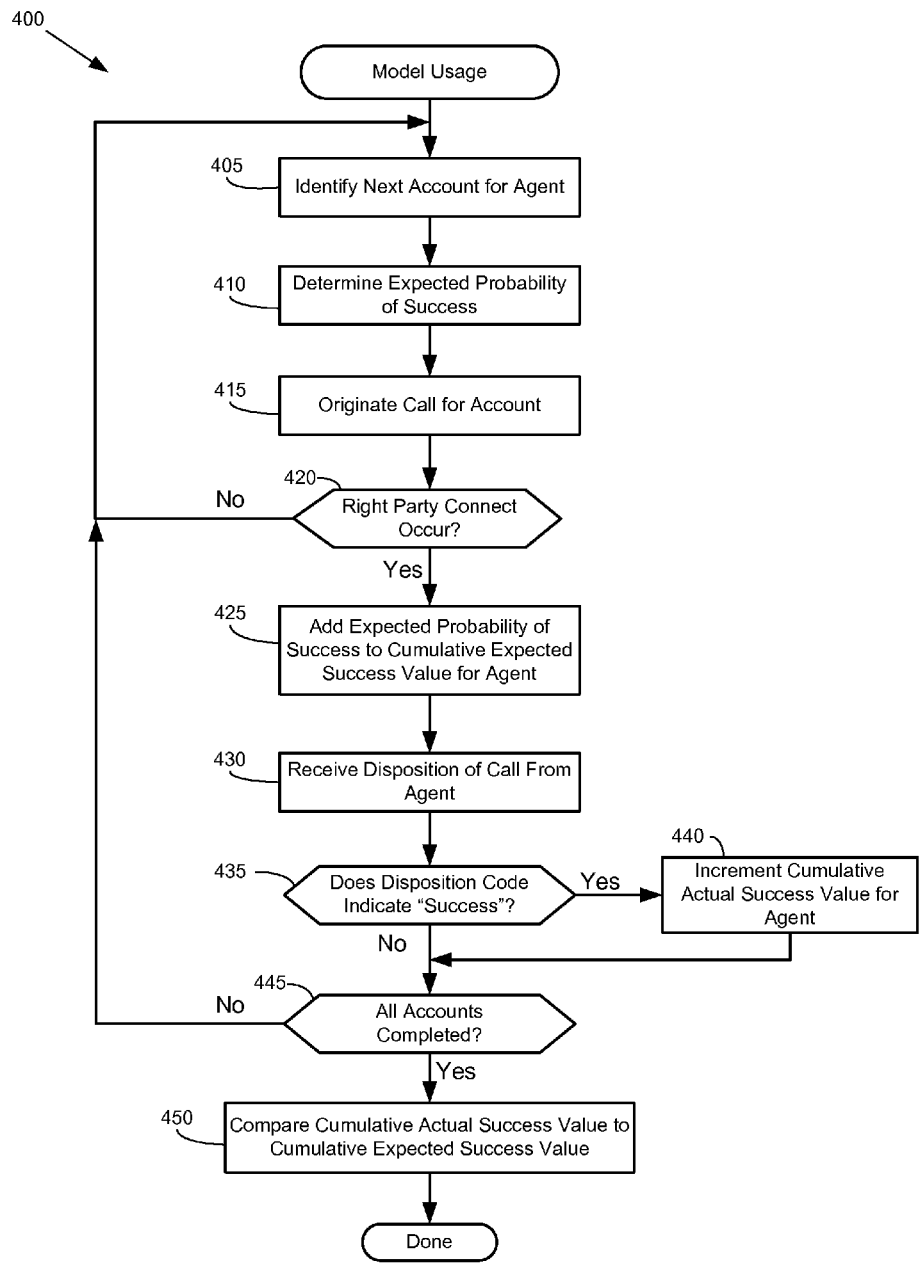
FIG. 4 illustrates a process flow of an embodiment for using the predictive model to maintain a cumulative expected probability of success.
Figure 5:
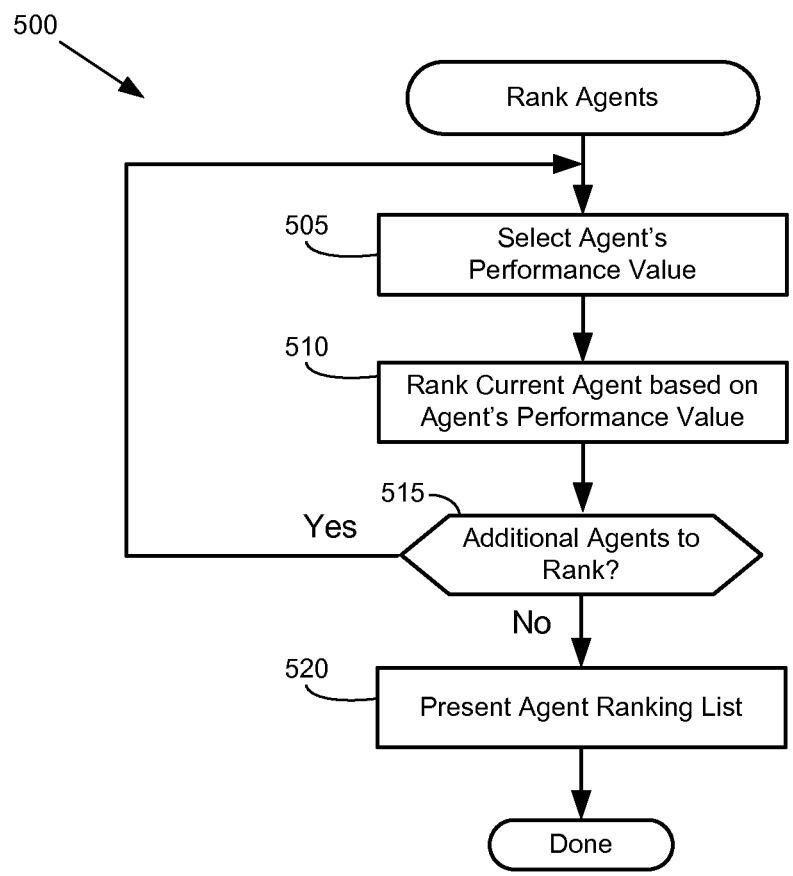
FIG. 5 illustrates a process flow of an embodiment for ranking agents based on their respective performance.

One embodiment of a service illustrating application of the concepts is reflected in the process flows of FIGS. 3-5. The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Turning to FIG. 3, the process 300 shown illustrates generic steps for development of a predictive model that provides a probability of success for a particular account after reaching a RPC. Typically, the probability is contingent upon reaching a RPC, although it may be for a call attempted. The development of such models is well known in the art, and the factors considered for a particular model are dependent on that specific application. Although the principles and concepts of developing a predictive model that are illustrated use a debt-collection call type, the principles and concepts may apply to other applications and call types.

The initial operation is to collect a sufficient number of calls of an applicable calling campaign in operation 305 that can be used to construct a baseline model. This may be a number of calls over a contiguous time period, which ensures that any one factor is not unduly weighted. For example, using the debt collection call application, these calls may be collected over a period of several months. Several thousand calls may be involved. Typically, the larger the sample size, the less impact that infrequent factors may have on the model. For example, a large sample size may ensure that an adequate number of calls are obtained that occur over certain time periods, such as near the end of a week, at mid-month, or near the end of a month. The success of a debt-collection call may be influenced when the individual is contacted relative to their paydays (assuming the person is employed). Thus, a large sample of calls ensures that any relative success (or lack thereof) is adequately represented. Otherwise, the model may not be as accurate as it could be in predicting the likelihood of receiving a promise to pay.

Similarly, obtaining a large sample may account for seasonal variations impacting the outcome of the call. Additional credit card debts may be incurred after the holiday season, and debt collection calls for delinquent credit card debts may increase in the initial few months of a year, following the holiday season. This may be followed by an increased promise to pay in the early spring time. On the other hand, delinquent credit card debts occurring mid-year may not be due to such seasonal factors, but caused by other factors and may have different likelihoods of success. Thus, how large of a sample is required to provide the desired level of accuracy is dependent on each application, and can be evaluated based on the strength of the model and information values contributing to the estimates.

Next, the predictive model is constructed in operation 310. This model may take into account a number of factors, which again is specific to the application. For a debt-collection model, a likelihood of an account holder (e.g., the right party connected to the agent) providing a promise to pay may depend, in part, whether the account holder has been late in paying other accounts, how long the present account is delinquent, the current income of the account holder, and the amount of the account. For example, an account that frequently has a delinquent status and has frequently avoided past payments may have a lower $P_e(PtP)$ than an account that only has recently become delinquent for the first time, and the account holder has no other delinquent debts reported from a credit reporting agency. The predictive model may be created using various statistical modeling techniques, including generalized linear modeling techniques, logistic regression, Bayesian modeling techniques, tree base methods, etc.

Next, the predictive model is tested by applying the model to the collected history of calls in operation 315. The outcome of the collected history of calls is known, and the model is applied to the calls to ascertain the predicted outcome of each call in operation 320. If the model is 100% accurate, then the expected results should align with the actual results. In practice, 100% accuracy is rarely, if ever, obtained, when predicted results are compared with the actual results. If the results do not meet a target threshold in operation 330, then the model is modified in operation 325 in an attempt to improve the accuracy and the process is repeated.

The steps required to improve the accuracy of the model may be unique to the particular application. Those skilled in the art may analyze the results of the collected history of calls, and may determine that additional factors impacting the outcome of the call can be incorporated. For example, the time-of-day may be analyzed for the history of calls to ascertain potential patterns impacting the likelihood of success. These factors may be incorporated into the model, thus taking into account the time-of-day as are other factors (such as, e.g., day of week or day of month).

The process then returns to rerun the model against the collection of historical calls in operation 315 until the accuracy threshold reaches a desired accuracy in operation 330. Once the desired level of accuracy in predicting an aggregate outcome is accomplished, then the model is ready to use for prospective calls.

At various stages of using the predictive model, which is discussed in FIG. 4, it may be appropriate to refine the predictive model based on changing circumstances. For example, a predictive model developed using calls from the June through September time period would not take into account any seasonal variation involving calls occurring during the end-of-year holidays (e.g., November-December). Once calls from the end-of-year are obtained, these may be analyzed using various statistical modeling techniques to ascertain the influence the end-of-year may have on the expected outcome. This may be reflected by modifying the predictive model as described in FIG. 3 using certain factors. Similarly, a contact center handling one type of debt collection calls (e.g., credit card) may have a predictive model that does not accurately predict the likelihood of success for handling another type of debt collection calls (automobile loans). After a period of time allowing a sufficient call history to be developed, the predictive model can be refined to accommodate this new type of debt collection call. Thus, the model refinement process may occasionally occur by entering the process flow 300 at operation 315 (instead of operation 305) by applying a history of collected calls to see if the model's accuracy improves or reflects changing circumstances. Other model rebuilding or refining techniques may be applied, as is known by those skilled in art. This may involve dropping individual data elements to simplify the model, but without significant degradation of its accuracy. As experience with the model is obtained, the model may be refined to focus on the data elements with the strongest correlation to the outcome.

Turning to FIG. 4, a process flow is illustrated of one embodiment of processing account records. These account records are presumed to be for a debt collection call type, and a set of records may be assigned to each agent to complete on a given day (or other time period). The process 400 begins by identifying the next account for the agent in operation 405. Next, the expected probability of success is calculated for this account in operation 410. As noted previously, in this example "success" is defined as the right person providing a PtP, and the probability of success may be predicated on first obtaining a RPC or based on the attempted call. This value, the $P_e(PtP)$, may have been calculated prior to identifying the account and associated with the call record. If not, the $P_e(PtP)$ may be calculated in real time after the account is selected, or after a RPC is obtained.

Next, the call is originated for that account in operation 415. This may use a variety of dialing techniques, such as preview dialing, manual dialing, or predictive dialing. If a RPC is established, namely that the intended person is reached (as opposed to a no-answer condition, busy, voicemail or a wrong party answers) in operation 420, then the process continues to operation 425. If a RPC does not occur, then the process loops back to operation 405. If a RPC does not occur, then the $P_e(PtP)$ for that account is not added to the cumulative total of the expected success. Thus, it can be seen that waiting for a RPC before calculating the $P_e(PtP)$ for that account may avoid unnecessary processing of the $P_e(PtP)$ in cases where a RPC is not obtained.

Assuming a right party answers in operation 420, the $P_e(PtP)$ for that account is then added to the cumulative expected success value for the agent in operation 425. Initially, the cumulative expected success value is set to zero at the beginning of the list processing. Thus, for each right party reached, the expected PtP is added for that agent's cumulative value.

The agent will converse with the party, and attempt to obtain a promise to pay from the party. Once the call is ended, the agent provides a disposition code to the system, which is received in operation 430. The disposition code may be restricted to a set of certain values, such as reflecting there was (or was not) a promise to pay, or what type of promise was given. Regardless of how the disposition code is defined to be a "success", a test determines whether the call's disposition code reflects a "success" in operation 435. If so, this results in the cumulative actual success value to be incremented for that agent in operation 440. Similar to the cumulative expected success value, the cumulative actual success value is set to zero at the beginning of the evaluation time period. In one embodiment, a value of one is added to the cumulative actual success value for each successful call. The value used to increment the cumulative actual success value must correlate to the basis used for the expected PtP. For example, if the PtP is based on a percentage (or fraction) based on 100% then an actual success would result in adding one to the value. On the other hand, if the cumulative expected success value is defined to be an integer between 1 and 100, then a successful actual outcome would result in adding the maximum value (e.g., 100 points) to the agent's cumulative actual success value.

From the above, it is apparent that for each call resulting in a right party connect, the expected PtP is added to the agent's cumulative expected success value, and for each right party connect that results in a successful call, the cumulative actual success value is incremented for that agent.

Next, a test occurs to determine whether all accounts allocated to the agent are completed in operation 445. In other embodiments, this operation may simply determine if all the allocated telephone numbers have been dialed. If the answer is no, the process loops back to operation 405 to then dial the next number on the list.

If the answer is yes in operation 445, then the agent's performance can be determined in operation 450. This can be accomplished by comparing the agent's cumulative actual success value to the agent's cumulative expected success value. In one embodiment, the comparison can be accomplished by ascertaining a ratio or percentage by dividing the cumulative expected success value into the cumulative actual success value. A value of 100% or 1 indicates that the agent performed exactly as expected. A value greater than 100% or 1 indicates the agent performed better than expected, whereas a value less than 100% or 1 indicates the agent performed worse than expected.

The process flow does not consider calls that do not encounter a right party connect. Consequently, if the agent reaches a party who informs the agent that the right party (e.g., the debtor) is not home, the agent will enter a disposition code indicating the right party was not reached. Clearly, the agent cannot attempt to elicit a promise to pay from the right party if the right party is not present. In one embodiment, the agent is only evaluated against calls in which the right party is contacted.

In this embodiment, the predictive model will evaluate and provide the expected probability that the agent will be successful given the particular account is reached. Thus, if the account is expected to provide a promise to pay, the calculated $P_e(PtP)$ will be added to the current running value of the cumulative expected success value. An agent achieving success for that account will have their cumulative actual success value incremented, typically by a value of one. If the $P_e(PtP)$ is relatively high for the account, then adding one to the cumulative actual success value will only slightly lift the agent's overall performance relative to the cumulative expected success value because the agent was generally expected to be successful.

However, consider the case where the agent is able to obtain a PtP, but from an account that was not generally expected to pay. In this case, the $P_e(PtP)$ is zero (or very low) and this value is added to the agent's cumulative expected success value. Accordingly, the cumulative actual success value is still incremented by one and thus, the agent's performance raises their overall performance average because the agent was successful in a more difficult situation.

In other embodiments, various factors may be used to adjust either the $P_e(PtP)$ or the cumulative actual success value for an agent. A novice agent, for example, may be compensated for having a low experience level, relative to other agents. One approach for adjusting a novice agent's performance level is to increment the cumulative actual success value with a value greater than 1, e.g., 1.05 that would represent a 5% adjustment. Alternatively, the $P_e(PtP)$ could be adjusted downward for each account by a percentage. However, if the model is developed using agents with various experience levels, then it may not be necessary to adjust the performance level of a particular agent. However, if the predictive model is developed using call histories only involving experienced agents, then this adjustment factor may be introduced for a novice agent.

Agent Ranking

Once each agent's performance value is determined for a particular time period (typically a day, week, or campaign), then a relative comparison can be made of the agents' performances. The resulting relative agent performances are for a particular campaign and allow comparison of agents within that campaign. In fact, assuming the predictive models are similar in their accuracy in reflecting the $P_e(PtP)$ for each campaign, then it is possible to compare agents' performances among different campaigns. This presumes that a sufficient number of calls handled by the agent have occurred that allow accurate assessment of the agent's performance. If an insufficient number of calls is handled by the agent, then the agent may not be included in the comparison, or if included, they may be flagged in some manner so as to explain any potentially significant deviation of their performance.

The process 500 begins with selecting an agent's performance value from the list of agents being ranked in operation 505. In the first pass, this would be a first agent's performance value, whereas in other subsequent passes, this would be the next agent to be ranked. Next, the current agent is ranked based on their performance value relative to other agents' information in operation 510. In the first pass, this operation is null since there are no other agents who have yet been ranked. Next, a test occurs in operation 515 to determine if there are additional agents to rank. If the determination is 'yes', then the process loops back to operation 505 where the next agent's performance value is retrieved. Once the process is completed, then the agent ranking list is presented in operation 520. Typically, the ranking is provided as a report to a supervisor.

Figure 6:
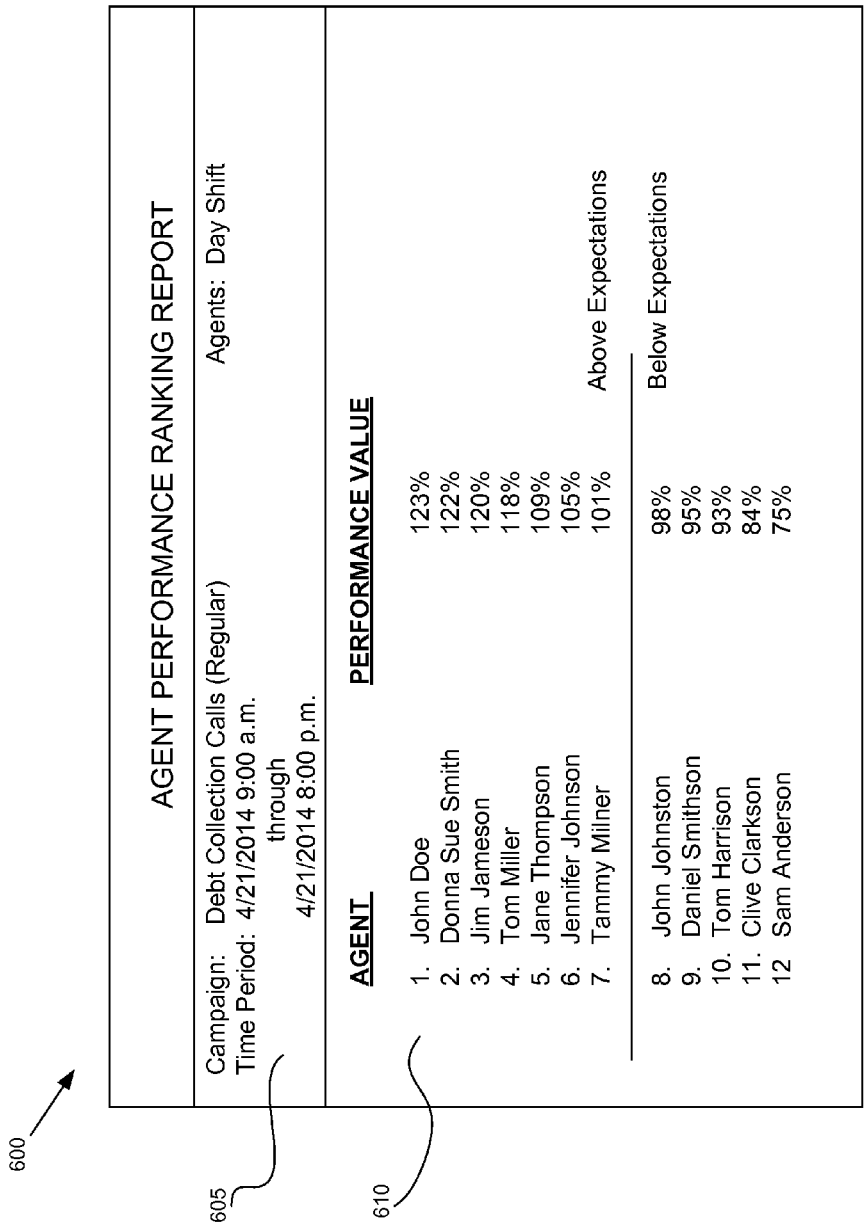
FIG. 6 illustrates an embodiment of a report for ranking agents according to the respective relative performance.

A representative agent listing report is shown in FIG. 6. This graphical user interface ("GUI") 600 may be presented to a supervisor indicating agent performance values for an evaluation time period and for a particular campaign. A portion of the display 605 may include various information detailing the time period and any other qualification associated with the agents listed in the report. A second portion of the display 610 may include a ranked list of the agent's names and their corresponding performance value, shown here as expressed as a percentage of their expected performance value. Other formats are possible, and may normalize the performance value to e.g., a value between 0 and 1, or 0 and 100. In this example, a line delineates those agents whose performance exceeds an expected value ("Above Expectations") (e.g., is greater than 100%) or is less than an expected value ("Below Expectations").

In various embodiments, the generation of the agent ranking performance report may be generated periodically for management to review. In many instances, agents in the top percentiles or bottom percentiles are specifically noted. For example, the top agents may be called out for their performance, and the bottom agents may be targeted for further monitoring. Further, each agent may receive periodic notification of their relative performance value. Unlike other performance ranking methods, the agent may receive useful information as to their performance without having to know their relative performance to other agents. Because the model defines an expected performance, an agent performing at e.g., 110% of expectations knows that they are operating 10% above expectations. The agent does not have to know their relative ranking order to know whether they are performing above expectations and to what extent. This avoids an agent questioning whether their performance was hindered by the particular campaign they were assigned to, or by the particular list of numbers from the campaign that was assigned to them.

Utilization of Agent Performance Ranking Report

The agent performance ranking report can then be used in various ways. One use is to improve the performance of agents performing "Below Expectations." In one embodiment, such agents can be selected to receive individual training or mentoring. In one embodiment, agents with an "Above Expectations" performance rating can be selected to mentor those agents having a "Below Expectations" performance rating. The mentoring may involve pairing the two agents together to review call recordings or discuss how a hypothetical situation could be handled. Although the agent performance ranking does not indicate why one agent's performance is better than another, allowing agents to meet and discuss how to improve an agent's performance is likely to result in increasing that agent's performance.

In addition, the agent performance ranking report can be used to set agent compensation or reward an agent in some manner, such as determining a preference for an agent's days off, or preferences for future scheduling of the agent's shifts by a workforce management system. In other embodiments, agent's may be awarded "employee points" which are allocated to each agent that can be used for various scheduling purposes, such as detailed in U.S. patent application Ser. No. 14/095,354, entitled "Managing Employee Point Awards in a Contact Center," filed on Dec. 3, 2013.

Another approach for using the agent performance ranking report is to identify the calls of the top agent performers (and/or bottom agent performers). These calls may be subsequently analyzed using speech analytics. This may involve analyzing the calls to determine common characteristics, such as:

Determining a percentage of the conversation (as measure by time or word count) in which the party is speaking versus the agent.

Determining a relative dialogue format between the party and the agent. That is, how long does each party speak and in what order, relative to the duration of the call.

Determining a relative emotional index of the speech used by the agent during various portions of the call.

Determining how long and how often the agent places the party on hold during calls.

For instance, the calls selected for analysis may be those successful calls that have a low $P_e(PtP)$. In other words, those calls in which an average agent was not expected to be successful. Since the agents were actually successful for these calls, then the calls may be presumed to have been successful largely in part due to the agents' skills in handling the calls. Consequently, these calls may serve as model calls to teach others.

Exemplary Processing Device Architecture

Figure 7:
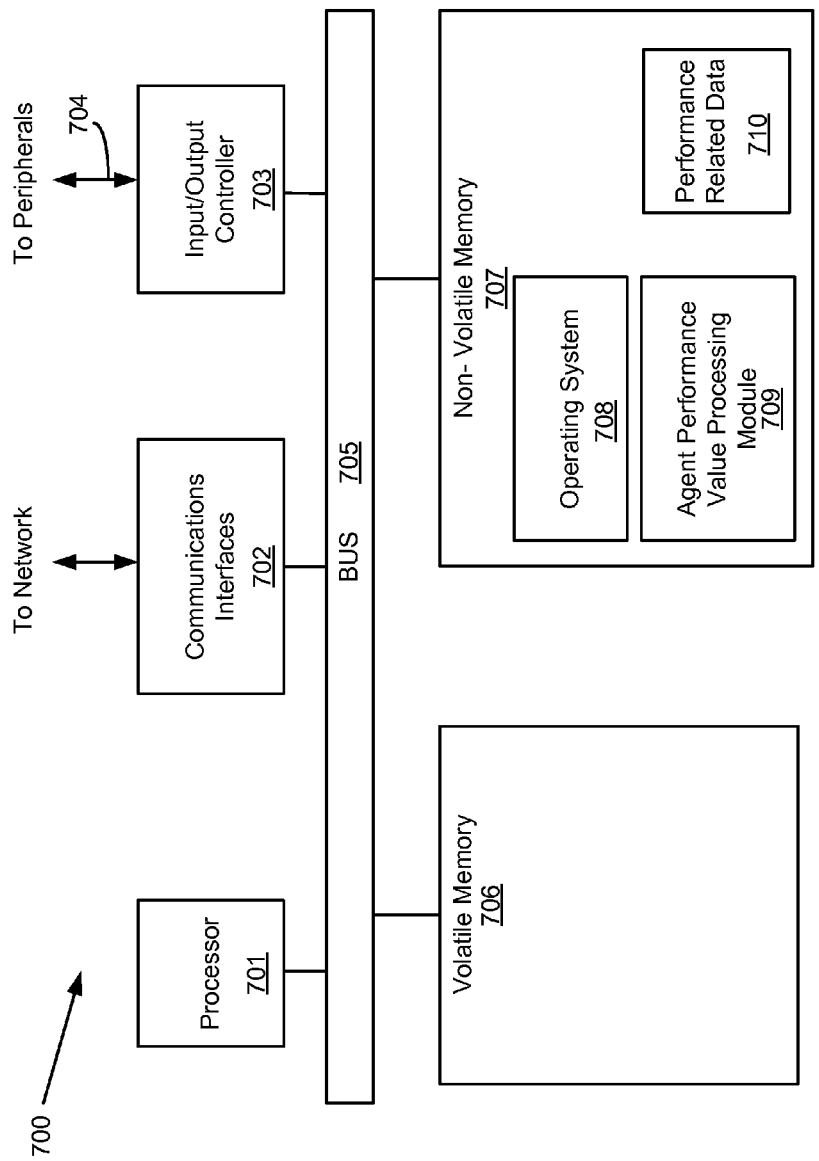
FIG. 7 illustrates an architecture of a processing system for practicing the concepts and technologies disclosed herein.

As discussed in conjunction with FIG. 1, the contact center architecture 100 may comprise various components that comprise a processing system. FIG. 7 is an exemplary schematic diagram of a processing system 700 that may be used in an embodiment to practice the technologies disclosed herein. Specifically, this could represent the predictive model platform component 185 shown in FIG. 1. In other embodiments, the predictive model platform processing system may be integrated into a call handler. In general, the term "processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein.

As shown in FIG. 7, the processing system 700 may include one or more processors 701 that may communicate with other elements within the processing system 700 via a bus 705. The processor 701 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing system 700 may also include one or more communications interfaces 702 for communicating data via the local network with various external devices, such as other components of FIG. 1. In other embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 703 may also communicate with one or more input devices or peripherals using an interface 704, such as, but not limited to: a keyboard, a mouse, a touch screen/display input, microphone, pointing device, etc. The input/output controller 703 may also communicate with output devices or peripherals, such as displays, printers, speakers, headsets, banner displays, etc.

The processor 701 may be configured to execute instructions stored in volatile memory 706, non-volatile memory 707, or other forms of computer-readable storage media accessible to the processor 701. The volatile memory 706 may comprise various types of memory technologies, including, but not limited to: random access memory ("RAM"), dynamic random access memory ("DRAM"), static random access memory ("SRAM"), and other forms well known to those skilled in the art. The non-volatile memory 707 may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 707 may store program code and data, which also may be loaded into the volatile memory 706 at execution time. Specifically, the non-volatile memory 707 may store one or more computer program modules, such as the agent performance value processing module 709, and performance related data 710, and/or operating system code 708 containing instructions for performing the process and/or functions associated with the technologies disclosed herein. The agent performance value processing module 709 generates the expected probability of success using the predictive model and may store and/or add this to a cumulative value that is stored as the performance related data 710 in the non-volatile memory 707, as well as in the volatile memory 706. The volatile memory 706 and/or non-volatile memory 707 may be used to store other information including, but not limited to: records, applications, programs, scripts, source code, object code, byte code, compiled code, interpreted code, machine code, executable instructions, or the like. These may be executed or processed by, for example, the processor 701. These may form a part of, or may interact with, the agent performance value processing module 709 and/or the performance related data 710.

The technologies described herein may be implemented in various ways, including as computer program products comprising memory storing instructions causing a processor to perform the operations associated with the above technologies. The computer program product may comprise a tangible non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such tangible, non-transitory computer readable storage media include all the above identified media (including volatile and non-volatile media), but does not include a transitory, propagating signal. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-Ray™ disc ("BD"), any other non-transitory optical medium, and/or the like. Non-volatile computer-readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. For example, the principles and concepts have been illustrated by contact center agents for debt collection call types, but the concepts and principles may apply to other call types.

Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A method for determining a performance value indicating performance of an agent in a contact center handling outbound calls, comprising:
    developing a predictive model configured to indicate an expected likelihood of a successful outcome of the agent interacting with a respective account holder represented by a contact in a dialing list;
    initiating an outbound call for each of a plurality of contacts in the dialing list by a call handler, wherein upon the outbound call resulting in a right party connect in which the respective account holder interacts with the agent:
        determining the expected likelihood of the successful outcome by a predictive module platform system using the predictive model for the outbound call;
        incrementing a cumulative expected success value for the agent by the predictive module platform system adding the expected likelihood of the successful outcome to the cumulative expected success value;
        receiving a call disposition code at the call handler indicated by the agent for the outbound call, the call disposition code indicating whether the successful outcome occurred from the agent interacting with the respective account holder; and
        incrementing a cumulative actual success value for the agent by the predictive module platform system adding a predetermined value to the cumulative actual success value upon the call disposition code indicating the successful outcome occurred;

ascertaining the performance value for the agent by comparing the cumulative actual success value with the cumulative expected success value;

ranking the performance value of the agent among a plurality of performance values associated with a plurality of agents;

identifying the agent as a top performer with respect to the plurality of agents based on the ranking of the performance value of the agent; and in response to identifying the agent as a top performer:

identifying a plurality of outbound calls handled by the agent in which the expected likelihood of the successful outcome for each of the calls in the plurality of outbound calls was below a threshold value and the disposition code for each of the calls in the plurality of outbound calls indicated the successful outcome occurred; and performing speech analytics on the plurality of outbound calls by a speech analytics system to identify one or more common characteristics within the plurality of outbound calls reflective of one or more skills of the agent in handling the plurality of outbound calls.

2. The method of claim 1, wherein the outbound call for each of the plurality of contacts in the dialing list is a debt-collection call type and the expected likelihood of the successful outcome is an expected likelihood of the respective account holder providing a promise-to-pay to the agent as determined by the predictive model.

3. The method of claim 2, where the call disposition code provided to the call handler reflects whether the respective account holder provided a promise to make a payment on a debt.

4. The method of claim 1, wherein comparing the cumulative actual success value with the cumulative expected success value involves computing a ratio of the cumulative actual success value to the cumulative expected success value.

5. The method of claim 1, wherein the performance value is expressed as a percentage value in which if the percentage value exceeds 100%, then the performance value indicates the agent is performing above expectations.

6. A non-transitory computer readable medium storing instructions that when executed cause one or more processors to:

based upon an outbound call initiated for an agent in a contact center for each of a plurality of contacts in a dialing list resulting in a right party answering who interacts with the agent:

determine an expected likelihood of a successful outcome by using a predictive model for the outbound call;

increment a cumulative expected success value for the agent by adding the expected likelihood of the successful outcome to the cumulative expected success value;

receive an indication on whether the successful outcome occurred from the agent interacting with the right party; and increment a cumulative actual success value for the agent by adding a predetermined value to the cumulative actual success value upon the indication identifying the successful outcome occurred;

ascertain a performance value for the agent by comparing the cumulative actual success value with the cumulative expected success value;

rank the performance value of the agent among a plurality of performance values associated with a plurality of agents;

identify the agent as a top performer with respect to the plurality of agents based on the ranking of the performance value of the agent; and in response to identifying the agent as a top performer:

identify a plurality of outbound calls handled by the agent in which the expected likelihood of the successful outcome for each of the calls in the plurality of outbound calls was below a threshold value and the indication for each of the calls in the plurality of outbound calls identifying the successful outcome occurred; and perform speech analytics on the plurality of outbound calls to identify one or more common characteristics within the plurality of outbound calls reflective of one or more skills of the agent in handling the plurality of outbound calls.

7. The non-transitory computer readable medium of claim 6, wherein the indication reflects whether a promise-to-pay was provided from the right party.

8. The non-transitory computer readable medium of claim 6, wherein comparing the cumulative actual success value with the cumulative expected success value involves computing a ratio of the cumulative actual success value to the cumulative expected success value.

9. A system for determining a performance value indicating performance of an agent in a contact center handling outbound calls, the system comprising at least one processor configured to:

based upon an outbound call initiated for each of a plurality of contacts in a dialing list resulting in a right party answering who interacts with the agent:

determine an expected likelihood of a successful outcome by using a predictive model for the outbound call;

increment a cumulative expected success value for the agent by adding the respective expected likelihood of the successful outcome to the cumulative expected success value;

receive an indication on whether the successful outcome occurred from the agent interacting with the right party; and increment a cumulative actual success value for the agent by adding a predetermined value to the cumulative actual success value; and ascertain the performance value for the agent by comparing the cumulative actual success value with the cumulative expected success value;

rank the performance value of the agent among a plurality of performance values associated with a plurality of agents;

identify the agent as a top performer with respect to the plurality of agents based on the ranking of the performance value of the agent; and in response to identifying the agent as a top performer:

identify a plurality of outbound calls handled by the agent in which the expected likelihood of the successful outcome for each of the calls in the plurality of outbound calls was below a threshold value and the indication for each of the calls in the plurality of outbound calls identifying the successful outcome occurred; and perform speech analytics on the plurality of outbound calls to identify one or more common characteristics within the plurality of outbound calls reflective of one or more skills of the agent in handling the plurality of outbound calls.

10. The system of claim 9, wherein the at least one processor is further configured to:
develop the predictive model configured to provide the expected likelihood of the successful outcome.

11. The system of claim 9, wherein the at least one processor is further configured to:
generate a performance ranking report comprising a ranking of the agent along with the plurality of agents.

12. The system of claim 9, wherein comparing the cumulative actual success value with the cumulative expected success value by the processor involves the processor computing a ratio of the cumulative actual success value to the cumulative expected success value.

13. The system of claim 9, wherein the indication reflects whether the right party committed to making a payment on a debt to the agent.

14. The method of claim 1, wherein the one or more common characteristics comprise at least one of: a percentage of the plurality of outbound calls measured by at least one of time and word count in which the respective account holder is speaking versus the agent; a relative dialogue format between the respective account holder and the agent for the plurality of outbound calls; a relative emotional index of speech used by the agent during various portions of the plurality of outbound calls; and how long and how often the agent places the respective account holder on hold during the plurality of outbound calls.

15. The non-transitory computer readable medium of claim 6, wherein the one or more common characteristics comprise at least one of: a percentage of the plurality of outbound calls measured by at least one of time and word count in which the right party is speaking versus the agent; a relative dialogue format between the right party and the agent for the plurality of outbound calls; a relative emotional index of speech used by the agent during various portions of the plurality of outbound calls; and how long and how often the agent places the right party on hold during the plurality of outbound calls.

16. The system of claim 9, wherein the one or more common characteristics comprise at least one of: a percentage of the plurality of outbound calls measured by at least one of time and word count in which the right party is speaking versus the agent; a relative dialogue format between the right party and the agent for the plurality of outbound calls; a relative emotional index of speech used by the agent during various portions of the plurality of outbound calls; and how long and how often the agent places the right party on hold during the plurality of outbound calls.

* * * * *